US010363606B2

United States Patent
Schlick et al.

(10) Patent No.: US 10,363,606 B2
(45) Date of Patent: Jul. 30, 2019

(54) DEVICE AND METHOD FOR THE GENERATIVE PRODUCTION OF A COMPONENT

(71) Applicant: MTU Aero Engines AG, Munich (DE)

(72) Inventors: Georg Schlick, Munich (DE); Andreas Jakimov, Munich (DE); Herbert Hanrieder, Hohenkammer (DE)

(73) Assignee: MTU Aero Engines AG, Munich (DE)

( * ) Notice: Subject to any disclaimer, the term of this patent is extended or adjusted under 35 U.S.C. 154(b) by 837 days.

(21) Appl. No.: 14/628,601

(22) Filed: Feb. 23, 2015

(65) Prior Publication Data

US 2015/0251250 A1 Sep. 10, 2015

(30) Foreign Application Priority Data

Mar. 6, 2014 (DE) .................. 10 2014 204 123

(51) Int. Cl.
*B22F 5/00* (2006.01)
*B22F 3/105* (2006.01)
(Continued)

(52) U.S. Cl.
CPC ............ *B22F 5/009* (2013.01); *B22F 3/1055* (2013.01); *B22F 3/24* (2013.01); *B23K 26/342* (2015.10);
(Continued)

(58) Field of Classification Search
CPC .......... B22F 5/009; B22F 3/1055; B22F 3/24; B22F 5/04; B22F 2003/1056;
(Continued)

(56) References Cited

U.S. PATENT DOCUMENTS

| 2,479,341 | A | * | 8/1949 | Gehr | ........................ | H05B 6/40 |
| | | | | | | 219/646 |
| 7,671,307 | B2 | * | 3/2010 | Nikanorov | ............... | C21D 1/42 |
| | | | | | | 219/645 |

(Continued)

FOREIGN PATENT DOCUMENTS

| CN | 102179517 | A | | 9/2011 | | |
| DE | 102012206122 | A1 | * | 10/2013 | ............. | B22F 3/105 |

OTHER PUBLICATIONS

Jamikov, Andreas, DE102012206122 (A1), Multiple coil arrangement for a device for the generative production of components and corresponding manufacturing method, Oct. 17, 2013, Espacenet translation, Description, Figures.*

*Primary Examiner* — Tu B Hoang
*Assistant Examiner* — Masahiko Muranami
(74) *Attorney, Agent, or Firm* — Barlow, Josephs & Holmes, Ltd.

(57) ABSTRACT

A device for the generative production of a component, particularly a component of a gas turbine engine, includes a working chamber, a hardening means, in particular a laser, for the layerwise local hardening of an initial material disposed in the working chamber, in order to produce the component layerwise in a direction of layer construction; and a movable induction heating arrangement with a first inductor and a second inductor for induction tempering in pre-determinable regions of the working chamber, wherein the first inductor engages in the second inductor at least in one operating position and/or the first and/or second inductor is disposed on a distribution means, in particular a slider, for the layerwise disposal of initial material in the working chamber.

10 Claims, 1 Drawing Sheet

(51) Int. Cl.
*B22F 3/24* (2006.01)
*B33Y 10/00* (2015.01)
*B33Y 30/00* (2015.01)
*C22F 1/00* (2006.01)
*F01D 5/14* (2006.01)
*H05B 6/10* (2006.01)
*B23K 26/342* (2014.01)
*B33Y 40/00* (2015.01)
*B22F 5/04* (2006.01)
*B33Y 80/00* (2015.01)

(52) U.S. Cl.
CPC .............. *B33Y 10/00* (2014.12); *B33Y 30/00* (2014.12); *B33Y 40/00* (2014.12); *C22F 1/00* (2013.01); *F01D 5/14* (2013.01); *H05B 6/101* (2013.01); *B22F 5/04* (2013.01); *B22F 2003/1056* (2013.01); *B22F 2003/248* (2013.01); *B33Y 80/00* (2014.12); *Y02P 10/295* (2015.11)

(58) Field of Classification Search
CPC .... B22F 2003/248; B23K 26/342; C22F 1/00; F01D 5/14; H05B 6/101; B33Y 10/00; B33Y 30/00; B33Y 40/00; B33Y 50/00; Y02P 10/295

USPC ....... 219/121.6, 121.73, 601, 607, 609, 610, 219/612, 614, 615, 616, 617, 622, 624, 219/630, 633, 635, 637, 644, 653, 656, 219/672, 673, 675, 676, 677, 200, 201, 219/520, 537, 619, 216; 399/4, 69, 70, 399/94, 98, 100, 111, 119, 122, 251, 328, 399/330, 333, 335, 336, 400, 408, 323, 399/329, 67, 68

See application file for complete search history.

(56) References Cited

U.S. PATENT DOCUMENTS

| | | | | |
|---|---|---|---|---|
| 2010/0212945 | A1* | 8/2010 | Faraci | H05B 6/14 174/259 |
| 2011/0123383 | A1* | 5/2011 | Fuwa | B22F 3/1055 419/11 |
| 2013/0105046 | A1* | 5/2013 | Carlson | B23K 11/11 148/526 |

* cited by examiner

DEVICE AND METHOD FOR THE GENERATIVE PRODUCTION OF A COMPONENT

BACKGROUND OF THE INVENTION

The present invention relates to a device and a method for the generative production of a component, particularly a component of a gas turbine engine.

In particular, gas turbine components such as guide vanes or rotating blades are difficult to produce due to their complex geometries and high stresses.

Therefore, it is known from in-house experience to generatively produce such components, in particular, by constructing the components in layers by layerwise local hardening of an initial material.

It is also known from in-house experience to inductively temper, by means of inductors, pre-determinable regions of a working chamber in which the component is generatively produced. In this way, the initial material can be pre-heated advantageously in order to improve its local hardening. Additionally or alternatively, the component that is forming can be tempered, in particular, it can be post-heated or cooled, especially in order to influence its structure and/or thermal stresses.

BRIEF SUMMARY OF THE INVENTION

An object of one embodiment of the present invention is to improve the generative production of a component, particularly a component of a gas turbine engine.

This object is achieved by a device and method of the present invention. Advantageous embodiments of the invention are the subject of the claims herein.

In one embodiment, a device for the generative production of a component, particularly of a component of a gas turbine engine, has a working chamber for receiving an initial material.

In one embodiment, the working chamber is bounded by a frame and a platform, which can be adjusted according to an enhancement, in particular the frame and platform can be displaced relative to one another, in order to be able to dispose successive new layers of initial material over the component that is being formed. The initial material can be a bulk material, in particular, it can be a powder, a paste, or a liquid, particularly a viscous liquid.

The device has a hardening means, in particular a laser, for the layerwise local hardening or bonding, in particular melting (on) or sintering, of the initial material disposed in the working chamber, in order to produce the component layerwise in a direction of layer construction. The initial material can be locally hardened or bonded layerwise by the hardening means thermally, optically, and/or chemically; in particular, it can be melted (on) or sintered, particularly with a layer lying thereunder in the direction of layer construction. In one embodiment, the device has a control for controlling the hardening means in such a way that it hardens or bonds the initial material disposed in the working chamber layerwise locally in cross-sectional regions of the component being produced. In one embodiment, the direction of layer construction can match a direction of adjustment of the platform and/or it can be oriented, at least substantially, counter to the direction of gravity or vertically upward.

The device further has a movable induction heating arrangement with a first inductor and a second inductor for induction tempering in pre-determinable regions of the working chamber.

The first and/or second inductor, in particular, may have at least one electrical winding, which has, in one embodiment, at least a 180° or at least a half loop, or a U-type or C-type loop. In one embodiment, the first and second inductors can be turned on with electrical power, in particular a.c. power, separately or independent of one another, by means of the control.

According to one aspect of the present invention, the first inductor engages in the second inductor—at least in one operating position, particularly only temporarily or permanently—in the direction toward the working chamber, in particular counter to the direction of layer construction or perpendicularly to the latter.

In this way, the first and second inductors can be positioned closer to the region being tempered, and thus especially an induction current can be better coupled.

In one embodiment, correspondingly—at least in one operating position, in particular only temporarily or permanently—an active surface area facing the working chamber, particularly a winding of the first inductor, this winding being next to the working chamber, is or will be distanced from an active surface area facing the working chamber, particularly of a winding of the second inductor, this winding being next to the working chamber, in the direction of layer construction, this distance being less than one wall thickness of the first inductor, measured on this active surface area facing the working chamber, this distance in particular being at most half the wall thickness. In this way, first and second inductors can be positioned vertically, close to the region being tempered.

In another embodiment, correspondingly—at least in one operating position, in particular only temporarily or permanently—an active surface area facing the working chamber, in particular a winding of the first inductor, this winding being next to the working chamber, is or will be distanced from an active surface area facing the working chamber, particularly of a winding of the second inductor, this winding being next to the working chamber, perpendicular to the direction of layer construction, this distance being less than one wall thickness of the first inductor, measured on this active surface area facing the working chamber, this distance in particular being at most half the wall thickness. In this way, first and second inductors can be positioned laterally or horizontally close to the region being tempered.

In one embodiment, the first inductor is adjustable relative to the second inductor, in particular manually and/or by a motor; in particular it can be displaced. Different regions being tempered can be pre-determined or set alternatively thereby, or different regions can be tempered in this way.

For this purpose, in an enhancement, the first inductor can be mounted adjustable on the second inductor; in particular, it can be displaced, especially manually and/or by means of a motor, so that the first inductor participates in an adjusting movement of the second inductor, and the latter can superimpose a relative adjusting movement.

In one embodiment, the first inductor can be adjustable perpendicular or crosswise to the direction of layer construction relative to the second inductor; in particular, it can be displaced. Additionally or alternatively, the first inductor can be adjustable in the direction of layer construction relative to the second inductor; in particular, it can be displaced. In particular, a first inductor disposed above or laterally next to the working chamber can be adjustable in the direction toward the working chamber or crosswise to the latter, relative to the second inductor. Additionally or alternatively, the first inductor can be adjustable relative to the second inductor perpendicular to an adjustment direction of the adjustable second inductor, whereby the adjustment direction of the adjustable second inductor can be especially oriented in the direction of layer construction or perpendicular or crosswise to the direction of layer construction. An adjustment or adjustability in one direction in the sense of the present invention can especially be an exclusive adjustment or adjustability only in this direction. Likewise, an adjustment or adjustability in one direction in the sense of the present invention can also be coupled with an adjustment or adjustability in another direction. Thus, for example, both a purely vertical adjustment as well as also an adjustment inclined toward the vertical can be an adjustment in the vertical direction in the sense of the present invention.

In one embodiment, the first inductor particularly has an active surface area facing the working chamber, in particular a winding of the first inductor next to the working chamber; two legs, especially at least substantially parallel or curved legs, which extend between two legs of the second inductor that are especially at least substantially parallel or curved legs, particularly of an active surface area of the second inductor, this area facing the working chamber and especially of a winding next to the working chamber, particularly at least substantially perpendicular or parallel to this inductor.

In one embodiment, the device has a movable distribution means, particularly a slider and/or an outlet for initial material, for the layerwise disposal of initial material in the working chamber.

According to another aspect of the present invention, which can be combined with the aspect explained above, the first and/or the second inductor is disposed on this movable distribution means.

In this way, the first and the second inductors do not require their own additional adjustment, but can be moved along by the movable distribution means and thus different regions being tempered can be pre-determined or set alternatively, or different regions can be tempered.

In one embodiment, the first inductor is disposed fixed in place or is adjustable, particularly by means of a motor; in particular it can be arranged to be displaced on the distribution means. Additionally or alternatively, the second inductor can be fixed in place or is adjustable, particularly by a motor; in particular it can be arranged to be displaced on the distribution means. Thus, in particular, the second inductor, which is disposed fixed in place on the distribution means, can move along rigidly with this means, and the first inductor, which is disposed adjustable on the distribution means, can be adjusted relative to this means and thus relative to the second inductor. Likewise, the first inductor, which is fixed in place on the distribution means, can move along rigidly with this means, and the second inductor, which is disposed adjustable on the distribution means, can be adjusted relative to this means and thus relative to the first inductor. Likewise, both the first inductor as well as the second inductor can be disposed adjustable on the distribution means and thus can be adjusted relative to this means and relative to one another, whereby in one embodiment, a somewhat crude pre-positioning can be advantageously produced by the distribution means, and a finer post-positioning or final positioning can be made relative to the distribution means by the adjustment of the inductors.

In particular, when the distribution means is also used for positioning the first and/or second inductor during the hardening, in one embodiment, a blade of the distribution means for the layerwise disposal of initial material can be adjusted, especially lowered, in the working chamber, in order to protect it, for example, from a laser beam that hardens the initial material. It may likewise be appropriate to distance the distribution means from the working chamber during the hardening in order to protect it, for example, from a laser beam that hardens the initial material.

According to one aspect of the present invention, a method for the generative production of a component, particularly a component of a gas turbine engine, by means of a device elucidated herein, comprises a layerwise local hardening or bonding, in particular melting (on) or sintering, of the initial material disposed in the working chamber, in order to produce the component layerwise in the direction of layer construction, whereby before, during, and/or after the hardening of one or more component layers, pre-determinable regions of the working chamber are inductively tempered by means of the movable induction heating arrangement.

In this way, during tempering, the first inductor engages in the second inductor only temporarily or permanently, so that the two inductors can be positioned closer to the region being tempered. Additionally or alternatively, the first and/or second inductor is placed in different positions by the distribution means for tempering before, during, and/or after the hardening of at least one layer of the component.

BRIEF DESCRIPTION OF THE DRAWINGS

Additional advantageous enhancements of the present invention can be taken from the dependent claims and the following description of preferred embodiments. For this purpose and partially schematized:

DETAILED DESCRIPTION OF THE INVENTION

Figure 1:
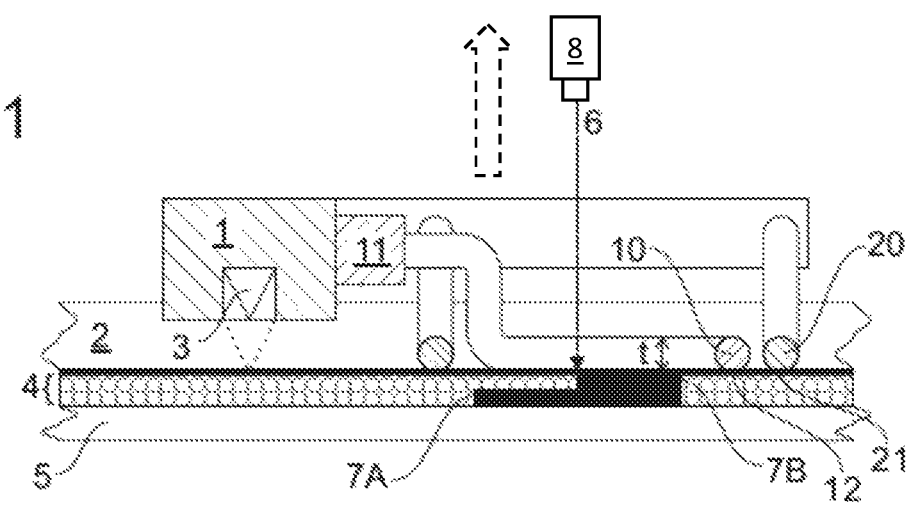
FIG. 1 shows a section along line I-I in FIG. 2.
Figure 2:
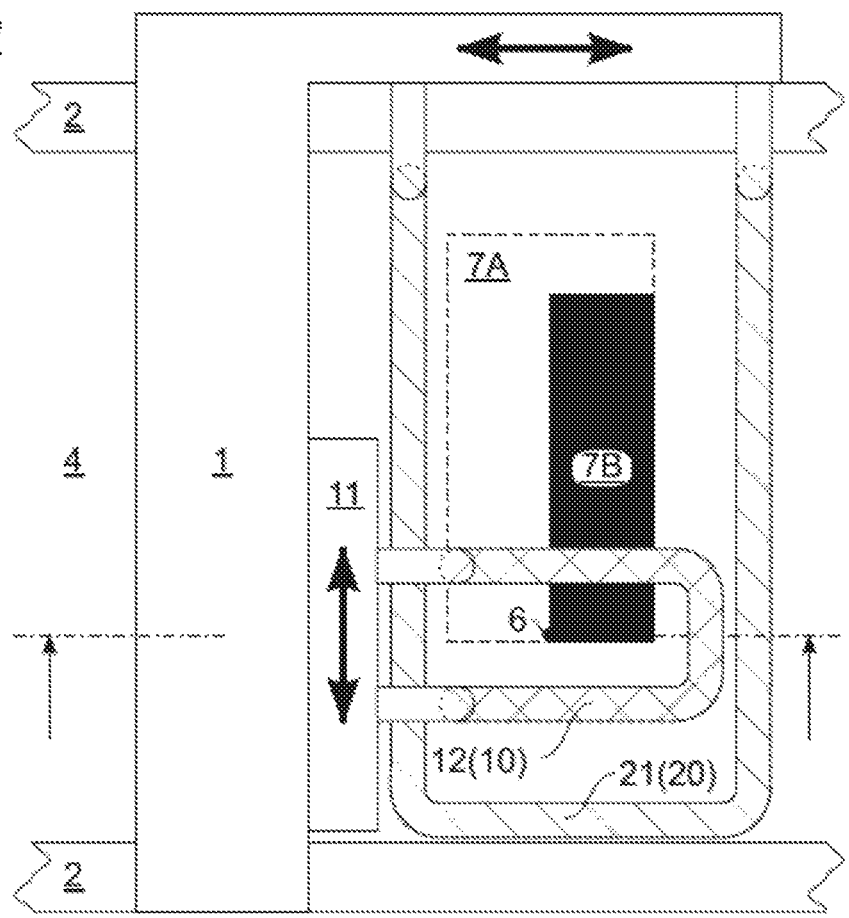
FIG. 2 shows a method step for a generative production of a component of a gas turbine engine by means of a device according to an embodiment of the present invention.

FIG. 2 shows a top view counter to a direction of layer construction onto a device for the generative production of a component of a gas turbine engine according to an embodiment of the present invention during one method step; FIG. 1 shows a section along line I-I in FIG. 2.

The device has a slider 1 with a blade 3 that can be lowered for the layerwise disposal of initial material 4 in a working chamber, which is bounded by a frame 2 and a platform 5 that can be adjusted in the direction of layer construction (vertical in FIG. 1, indicated by a broken arrow). In a way known in and of itself, the gas turbine component is generatively produced in successive layers 7A, 7B, in such a way that, alternately, the platform is lowered by one layer thickness counter to the direction of layer construction, the slider disposes a new layer of initial material over the component that is being formed, and a laser beam 6 of a laser 8 hardens this layer locally.

The movable slider 1 can be displaced on the frame 2 perpendicular to the direction of layer construction by means of a motor. A second inductor 20 of an induction heating arrangement for the induction tempering in pre-determinable regions of the working chamber is rigidly connected to the slider 1. In this way, the second inductor 20 can be displaced horizontally with the slider 1 in FIGS. 1, 2, in order to alternatively temper different regions of the working chamber, as is indicated in FIG. 2 by a horizontal double arrow for the adjusting movement.

A first inductor 10 of the induction heating arrangement for the induction tempering in pre-determinable regions of the working chamber is mounted on the slider 1 via a carriage 11 in a manner that is adjustable by means of a motor, as is indicated in FIG. 2 by a vertical double arrow for the adjusting movement. In this way, the first inductor is adjustable perpendicular to the direction of layer construction relative to the second inductor (vertical in FIG. 1), and is adjustable perpendicular to the direction of adjustment of the adjustable second inductor (horizontal in FIG. 2). In this way, the first inductor 10 can be displaced horizontally with the slider 1 in FIGS. 1, 2, and additionally can be displaced vertically relative to the second inductor 20 in FIG. 2, in order to alternatively temper different regions of the working chamber.

The second inductor 20 has a horseshoe-shaped half electrical loop with two parallel L-shaped legs (left, right in FIGS. 1, 2), which extend between the frame 2 and define an active surface area 21 of this single winding of the second inductor, this area facing the working chamber, thus next to the working chamber, this second inductor being indicated by the hatch marks in FIG. 2.

The first inductor 10 also has a horseshoe-shaped half electrical loop with two parallel L-shaped legs (top, bottom in FIG. 2), which extend perpendicular to the legs of the second inductor and define an active surface area 12 of this single winding of the first inductor, this area facing the working chamber, thus next to the working chamber, this first inductor being indicated by the cross hatch marks in FIG. 2.

Proceeding from the carriage 11, the first inductor 10 is bent twice in opposite directions, with the horseshoe-shaped half electrical loop of the first inductor 10 nested inside the horseshoe-shaped half electrical loop of the second inductor 20, and thus permanently engages in the second inductor 20. In this way, their two active surface areas 12, 21 can be positioned close to the working chamber, particularly in order to preheat the initial material to be hardened, and/or to post-heat the component being formed. Correspondingly, the active surface area 12 of the first inductor is distanced from the active surface area 21 of the second inductor in the direction of layer construction by less than one wall thickness t of the first inductor 10 at this active surface area 12 facing the working chamber (see FIG. 1).

Although exemplary embodiments were explained in the preceding description, it shall be noted that a plurality of modifications is possible.

Thus, in particular, the aspect of the arrangement of the first and/or second inductor 10, 20 on the slider 1 can also be realized without the engagement of the first inductor 10 in the second inductor 20. Likewise, the aspect of the first inductor 10 engaging in the second inductor 20 can also be realized without the first and/or second inductor 10, 20 being disposed on the slider 1.

In the example of embodiment, the induction heating arrangement 10, 20 is disposed vertically above the working chamber. Additionally or alternatively, an induction heating arrangement can also be disposed laterally next to the working chamber.

In addition, it shall be noted that the exemplary embodiments only involve examples that in no way shall limit the scope of protection, the applications and the construction. Rather, a guide is given to the person skilled in the art by the preceding description for implementing at least one exemplary embodiment, wherein various modifications can be carried out, in particular with respect to the function and arrangement of the described components, without leaving the scope of protection as it results from the claims and combinations of features equivalent to these.

The invention claimed is:

1. A device for the generative production of a component of a gas turbine engine, comprising:
   a frame and a platform defining at least a portion of a working chamber;
   a laser for the layerwise local hardening of an initial material disposed in a portion of the working chamber, configured and arranged to produce the component layerwise in a direction of layer construction; and
   a movable induction heating arrangement with a first inductor having a first electrical loop and a second inductor having a second electrical loop for induction tempering regions of the working chamber;
   wherein the first electrical loop of the first inductor is nested inside the second electrical loop of the second inductor, at least in one operating position, and
   wherein the second inductor is disposed on a slider, the slider being adjustably mounted on the frame, and the first inductor is disposed on a carriage, the carriage being slidably mounted on the slider; and
   wherein the slider disposes layerwise initial material in the working chamber and displaces horizontally the second inductor.

2. The device according to claim 1, wherein the first inductor is adjustable relative to the second inductor by a motor.

3. The device according to claim 1, wherein an active surface area of the first inductor, at least in one operating position, is a distance from an active surface area of the second inductor, in the direction of layer construction or perpendicular to the direction of layer construction, the distance between the active surface area of the first inductor and the active surface area of the second inductor being less than one wall thickness (t) of the first inductor at the active surface area facing the portion of the working chamber.

4. The device according to claim 1, wherein the first inductor has two parallel legs, which extend between two parallel legs of the second inductor.

5. A method for the generative production of a component of a gas turbine engine, comprising the steps of:
   providing a frame and a platform defining at least a portion of a working chamber;
   providing a laser for the layerwise local hardening of an initial material disposed in the working chamber, in order to produce the component layerwise in a direction of layer construction;
   providing a movable induction heating arrangement with a first inductor having a first electrical loop and a second inductor having a second electrical loop for induction tempering regions of the working chamber;
   wherein the first electrical loop the first inductor is nested inside the second electrical loop of the second inductor, at least in one operating position;
   layerwise local hardening of the initial material disposed, in order to produce the component layerwise in the direction of layer construction; and
   induction tempering in pre-determinable regions of the working chamber by the movable induction heating arrangement,
   wherein the second inductor is disposed on a slider, the slider being adjustably mounted on the frame, and the first inductor is disposed on a carriage, the carriage is slidably mounted on the slider; and wherein the slider disposes layerwise initial material in the working chamber and displaces horizontally the second inductor.

6. A device for the generative production of a component of a gas turbine engine, comprising:
- a frame and a platform defining at least a portion of a working chamber;
- a laser for the layerwise local hardening of an initial material disposed in the working chamber, in order to produce the component layerwise in a direction of layer construction; and
- a movable induction heating arrangement with a first inductor having a first electrical loop and a second inductor having a second electrical loop for induction tempering regions of the working chamber;
- wherein the first inductor and second inductor are disposed on a slider, for the layerwise disposal of initial material in the working chamber and displacement horizontally of the second inductor, and
- wherein the first inductor is disposed on a carriage, the carriage is slidably mounted on the slider.

7. The device according to claim 6, wherein the first inductor is disposed fixed in place or adjustable on the slider.

8. The device according to claim 6, wherein the second inductor is disposed fixed in place or adjustable on the slider.

9. The device according to claim 6, wherein the slider has an adjustable blade, which can be lowered, for the layerwise disposal of initial material in the working chamber.

10. The device according to claim 8, wherein
- layerwise local hardening of the initial material is disposed in the working chamber, in order to produce the component layerwise in the direction of layer construction; and
- induction tempering regions of the working chamber by the movable induction heating arrangement before, during and after the hardening of at least one component layer;
- wherein the first inductor and second inductor are placed in different positions by the slider for tempering at least one layer of the component.

\* \* \* \* \*